(12) United States Patent
Noda et al.

(10) Patent No.: US 10,941,019 B2
(45) Date of Patent: Mar. 9, 2021

(54) USER DETECTION SYSTEM AND IMAGE PROCESSING DEVICE

(71) Applicant: TOSHIBA ELEVATOR KABUSHIKI KAISHA, Kawasaki (JP)

(72) Inventors: Shuhei Noda, Minato Tokyo (JP); Kentaro Yokoi, Minato Tokyo (JP); Satoshi Tamura, Hamura Tokyo (JP); Sayumi Kimura, Kawasaki Kanagawa (JP)

(73) Assignee: TOSHIBA ELEVATOR KABUSHIKI KAISHA, Kawasaki (JP)

( * ) Notice: Subject to any disclaimer, the term of this patent is extended or adjusted under 35 U.S.C. 154(b) by 157 days.

(21) Appl. No.: 16/221,345

(22) Filed: Dec. 14, 2018

(65) Prior Publication Data

US 2019/0185295 A1  Jun. 20, 2019

(30) Foreign Application Priority Data

Dec. 15, 2017  (JP) .............. JP2017-240799

(51) Int. Cl.
*G06K 9/00* (2006.01)
*B66B 13/14* (2006.01)
*B66B 13/26* (2006.01)
*G06K 9/46* (2006.01)
(Continued)

(52) U.S. Cl.
CPC .......... *B66B 13/146* (2013.01); *B66B 13/26* (2013.01); *G06K 9/00771* (2013.01); *G06K 9/4633* (2013.01); *G06K 9/4638* (2013.01); *G06K 9/4642* (2013.01); *G06T 7/13* (2017.01); *G06T 7/74* (2017.01); *G06T 2207/30196* (2013.01)

(58) Field of Classification Search
CPC ......... B66B 13/146; B66B 13/26; G06T 7/13; G06T 7/74; G06T 7/0083; G06T 7/0085; G06T 5/001; G06T 2207/30196; G06T 2207/10016; G06K 9/48; G06K 9/00771
See application file for complete search history.

(56) References Cited

U.S. PATENT DOCUMENTS 5,387,768 A * 2/1995 Izard ................. G06F 7/00
                                                  187/392
9,082,018 B1 * 7/2015 Laska ............... G06K 9/00711
9,224,044 B1 * 12/2015 Laska ............... H04N 5/23293
(Continued)

FOREIGN PATENT DOCUMENTS

EP  3 192 762 A1  7/2017
JP  2010-111461 A  5/2010
(Continued)

*Primary Examiner* — Amir Alavi
(74) *Attorney, Agent, or Firm* — Foley & Lardner LLP

(57) ABSTRACT

According to one embodiment, a user detection system includes a camera, a boundary detector, a user detector and a controller. The camera is installed in a peripheral region of a door, and captures a running region when opening or closing the door and a region near the door. The boundary detector detects a boundary between a first structure and a second structure in the region near the door based on an image captured by the camera. The user detector detects whether there is a user in the running region based on a result detected by the boundary detector. The controller controls an open/close operation of the door based on a result detected by the user detector.

21 Claims, 14 Drawing Sheets

(51) Int. Cl.
    *G06T 7/73*           (2017.01)
    *G06T 7/13*           (2017.01)

(56)           References Cited

U.S. PATENT DOCUMENTS

| | | | |
|---|---|---|---|
| 9,354,794 B2 * | 5/2016 | Kirkby | G06K 9/2081 |
| 9,361,011 B1 * | 6/2016 | Burns | G06K 9/00771 |
| 9,361,521 B1 * | 6/2016 | McLean | G08B 13/19656 |
| 9,530,060 B2 * | 12/2016 | Zhang | G06T 7/0016 |
| 10,087,048 B2 * | 10/2018 | Kimura | B66B 5/0012 |
| 10,196,241 B2 * | 2/2019 | Noda | B66B 13/26 |
| 10,706,553 B2 * | 7/2020 | Yokoi | G06T 7/194 |
| 2004/0188185 A1 * | 9/2004 | Pieper | G07C 9/28 |
| | | | 187/391 |
| 2017/0197807 A1 | 7/2017 | Noda et al. | |
| 2019/0185295 A1 * | 6/2019 | Noda | G06K 9/00771 |

FOREIGN PATENT DOCUMENTS

| | | |
|---|---|---|
| JP | 4622416 B2 | 2/2011 |
| JP | 2011-93702 A | 5/2011 |
| JP | 2015-59013 A | 3/2015 |
| JP | 6092433 B1 | 3/2017 |
| JP | 2017-124906 A | 7/2017 |
| JP | 2017-126186 A | 7/2017 |
| WO | WO-00/47511 A1 | 8/2000 |

\* cited by examiner

USER DETECTION SYSTEM AND IMAGE PROCESSING DEVICE

CROSS-REFERENCE TO RELATED APPLICATIONS

This application is based upon and claims the benefit of priority from Japanese Patent Application No. 2017-240799, filed Dec. 15, 2017, the entire contents of which are incorporated herein by reference.

FIELD

Embodiments described herein relate generally to a user detection system and an image processing device.

BACKGROUND

In recent years, techniques have been developed to prevent a person and an object from being caught by the door of an elevator or an automatic door. For example, there is a technique in which a region near the door is captured by a camera, a person and an object likely to be caught by the door is detected from a captured image, and the detection result is reflected to the control of opening/closing the door.

In the above technique, first, an image of a state where a person and an object are not likely to be caught by the door is prepared as a reference image in advance. Then, the reference image is compared with the captured image captured by the camera to detect a person and an object likely to be caught by the door.

However, in the above technique, an illumination condition when the reference image is captured may be different from an illumination condition when the captured image is captured. In this case, there may cause a defect that a person and an object likely to be caught by the door are not possible to be normally detected without following a change in the illumination condition. In addition, since the reference image is necessarily prepared in advance in the above technique, the defect of requiring time and labor can be caused.

Therefore, there is a desire of developing a novel technology which can eliminate the above defect.

DETAILED DESCRIPTION

Figure 1:
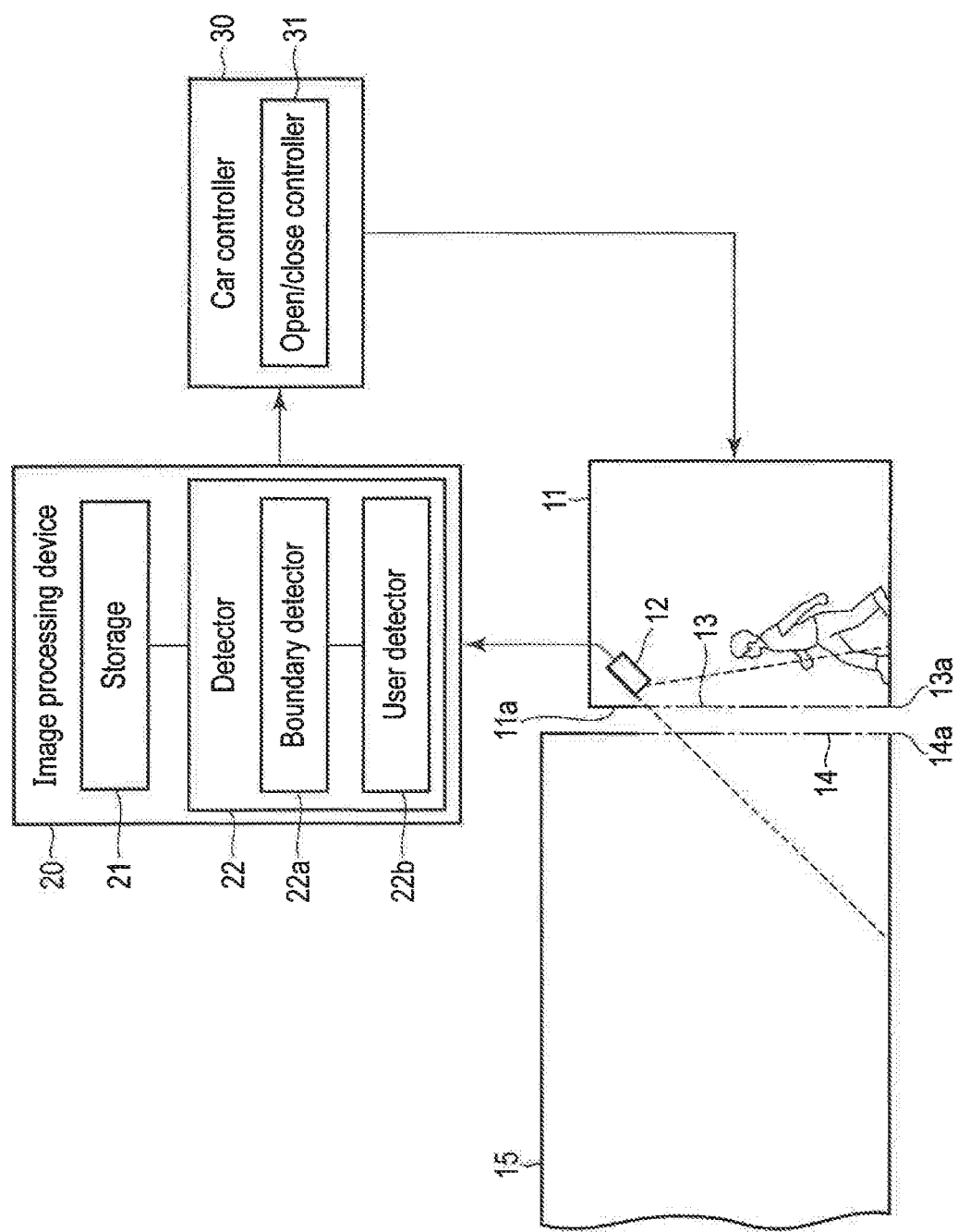
FIG. 1 illustrates a configuration of a user detection system according to a first embodiment.

In general, according to one embodiment, a user detection system includes a camera, a boundary detector, a user detector and a controller. The camera is installed in a peripheral region of a door, and captures a running region when opening or closing the door and a region near the door. The boundary detector detects a boundary between a first structure and a second structure in the region near the door based on an image captured by the camera. The user detector detects whether there is a user in the running region based on a result detected by the boundary detector. The controller controls an open/close operation of the door based on a result detected by the user detector.

Hereinafter, embodiments will be described with reference to the drawings. The disclosure is given as merely example, and the invention is not limited to the content described in the following embodiments. Modifications that a person skilled in the art could easily conceive shall be included in the scope of the disclosure. In order to make the invention more clear, sizes and shapes of portions in the drawings may be modified in relation to the actual embodiments. In a plurality of drawings, the corresponding elements will be attached with the same symbol, and the details thereof may be omitted.

In addition, in the following, various types of processes will be described by giving a door of an elevator as an example of a door by which a person and an object is likely to be caught. However, various types of processes described below may be applied to an automatic door instead of the elevator door.

Further, in the following, the elevator will be described as "elevator car" below.

First Embodiment

FIG. 1 is a diagram illustrating a configuration of a user detection system according to a first embodiment. Further, one elevator car herein will be described as an example, but a plurality of elevator cars may be applied.

In the user detection system according to this embodiment, a camera 12 is installed in the upper portion of the entrance of an elevator car 11. Specifically, the camera 12 is installed in a modesty panel 11a which covers the upper portion of the entrance of the elevator car 11 such that all the sill (threshold) of the elevator car 11 is contained in a capture range. In other words, the camera 12 is installed in a direction containing a running region where the door runs when being opened/closed and a region near the door are contained as a capture range.

The camera 12 includes, for example, a compact monitor camera such as an in-vehicle camera, equipped with a wide-angle lens, and can continuously capture images of several frames per second (for example, 30 frames/sec). The camera 12 is activated when a moving speed of the elevator car 11 is less than a predetermined value. Specifically, when the elevator car 11 starts deceleration to stop on a predetermined floor and the moving speed is less than the predetermined value, the camera 12 is activated, and starts capturing. In other words, the camera 12 continues capturing images from when the elevator car 11 starts decelerating to stop at a predetermined floor and the moving speed becomes less than the predetermined value, while the elevator car 11 is stopping at the predetermined floor, and until the elevator car 11 starts accelerating to move from the predetermined floor toward another floor and the speed of move becomes greater than or equal to the predetermined value.

In an elevator hall 15 of each floor, an elevator hall door 14 is installed in an arrival gate of the elevator car 11 to be freely open. The elevator hall door 14 is opened or closed in association with a car door 13 when the elevator car 11 arrives. Further, a power source (door motor) is located on a side of the elevator car 11. The elevator hall door 14 is only opened or closed following to the car door 13. In the following description, it is assumed that the elevator hall door 14 is opened when the car door 13 is opened, and the elevator hall door 14 is closed when the car door 13 is closed.

The images (video) continuously captured by the camera 12 are analyzed in real time by an image processing device 20 (user detection device). Further, in FIG. 1, the image processing device 20 is illustrated to be extracted from the elevator car 11 for convenience sake. However, in practice, the image processing device 20 is stored in the modesty panel 11a together with the camera 12.

In the image processing device 20, storage 21, and a detector 22 are provided. The image processing device 20 acquires an image which is captured by the camera 12. The storage 21 includes a buffer area to sequentially store the images captured by the camera 12, and to temporally store data necessary for the process of the detector 22. Further, in the storage 21, as a preprocessing for a captured image, an image subjected to a processing such as a distortion correction, a scaling, and a partial cutting may be stored. Further, in the storage 21, a program performed by a CPU (not illustrated) may be stored.

The detector 22 detects the edge of a structure which is located near the door of the elevator car 11 and has a predetermined shape. The detector 22 detects whether there is a user who is likely to be caught by the door based on the shape of the detected edge. In a case where it is detected that there is a user who is likely to be caught by the door, the detector 22 outputs a signal (instruction) related to the detection result to a car controller 30.

Further, a sill (threshold) will be described as an example of the structure which is located near the door of the elevator car 11. As the sill, there is a groove for opening/closing the door. In general, a car sill 13a for the car door 13 and an elevator hall sill 14a for the elevator hall door 14 are provided near the door.

The car controller 30 controls the operations of various types of devices (a destination floor button, an illumination, etc.) installed in the elevator car 11. In addition, the car controller 30 also controls the operations according to a signal output from the detector 22. For example, the car controller 30 controls the operation of a notification unit (not illustrated) installed in the elevator car 11 according to the signal output from the detector 22, and makes a warning to the user who is likely to be caught by the door.

In addition, the car controller 30 includes an open/close controller 31. The open/close controller 31 controls an open/close operation of the car door 13. The open/close controller 31 controls the open/close operation (keeping the open, opening reverse) of the car door 13 according to the signal output from the detector 22 in addition to the open/close control at a normal time.

The detector 22 includes a boundary detector 22a and a user detector 22b as illustrated in FIG. 1. Hereinafter, these functional units will be described in detail. Further, the boundary detector 22a and the user detector 22b may be realized by executing the program (that is, software) stored in the storage 21 by the CPU (not illustrated) in the image processing device 20, may be realized by hardware, or may be realized by a combination of hardware and software.

The boundary detector 22a acquires an image captured lately from among the captured images stored in the storage 21. The boundary detector 22a sets a detection area to detect a user who is likely to be caught by the door in the user detector 22b based on the captured image. The detection area is set at a position where the car sill 13a and the elevator hall sill 14a are estimated to be come out on the captured image. The position where the car sill 13a and the elevator hall sill 14a are estimated to be come out is calculated based on a dimension of the elevator car 11 and a unique value of the camera 12 (specifically, the following conditions (a) to (e)).

(a) Widths of the car sill 13a and the elevator hall sill 14a (b) Heights of the car door 13 and the elevator hall door 14

(c) Relative position of the camera 12 with respect to the car sill 13a and the elevator hall sill 14a in a three-dimensional space (d) Angles of three axes of the camera 12

(e) View angle and focal distance of the camera 12

Figure 2:
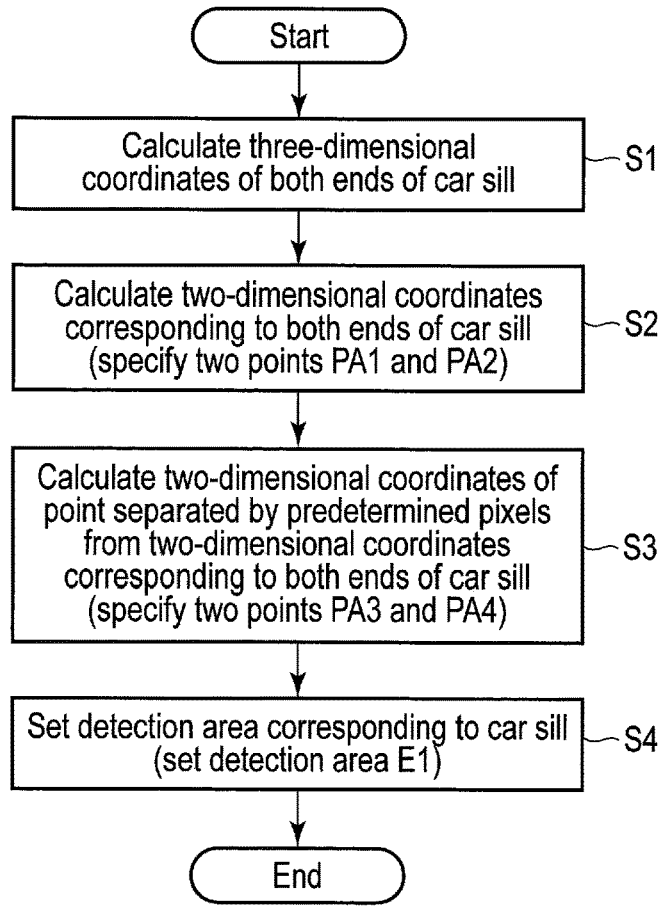
FIG. 2 is a flowchart illustrating an example of the procedure of a setting process of a detection area corresponding to a car sill according to the embodiment.

Herein, the description will be given about an example of the procedure of a setting process of the detection area corresponding to the car sill 13a which is performed by the boundary detector 22a with reference to the flowchart of FIG. 2 and the diagrams of FIGS. 3 and 4.

First, the boundary detector 22a calculates the three-dimensional coordinates of both ends of the car sill 13a in the floor surface based on the width (Condition a) of the car sill 13a and the relative position (Condition c) of the camera 12 with respect to the car sill 13a in the three-dimensional space (Step S1).

Figure 3:
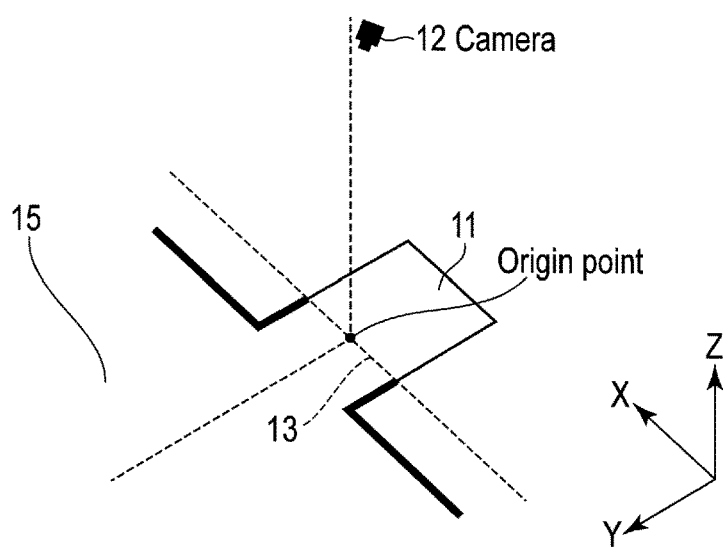
FIG. 3 is a diagram for describing three-dimensional coordinates according to the embodiment.

The three-dimensional coordinates are coordinates in a case where a direction in parallel with the car door 13 is an X axis, a direction of the elevator hall 15 from the center of the car door 13 (a direction perpendicular to the car door 13) is a Y axis, and a height direction of the elevator car 11 is a Z axis as illustrated in FIG. 3. In other words, the floor surface is considered to be a zero height in the three-dimensional space (in other words, the Z coordinate is "0").

Subsequently, the boundary detector 22a projects the three-dimensional coordinates of the both ends of the car sill 13a calculated in Step S1 to the two-dimensional coordinates on the captured image to calculate the two-dimensional coordinates corresponding to the both ends of the car sill 13a. Specifically, the boundary detector 22a calculates two-dimensional coordinates of points PA1 and PA2 in a case where a horizontal direction of the captured image illustrated in FIG. 4 is set to the X axis, and a vertical direction is set to the Y axis (Step S2).

Figure 4:
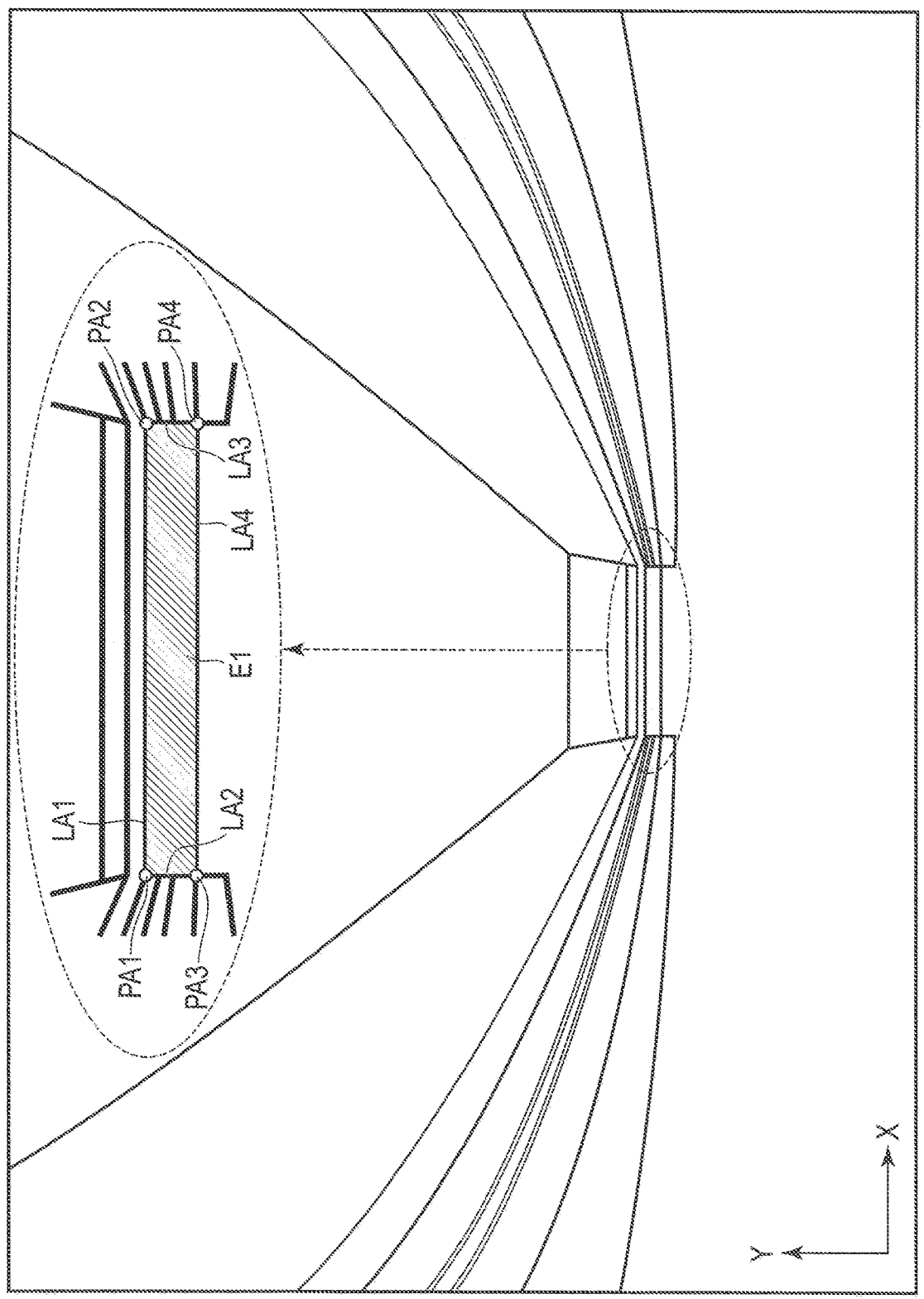
FIG. 4 illustrates an example of the detection area corresponding to the car sill according to the embodiment.

Next, as illustrated in FIG. 4, the boundary detector 22a calculates (specifies) two points PA3 and PA4 located to be separated in the vertical direction by predetermined pixels (for example, 5 pixels) from the pixels located at two points PA1 and PA2 which are specified by the two-dimensional coordinates calculated in Step S2 (Step S3). The vertical direction corresponds to the negative direction of the Y axis of the two-dimensional coordinates. Further, herein, points separated from the predetermined pixels from points PA1 and PA2 are calculated (specified) as points PA3 and PA4. However, for example, the points located to be separated in the vertical direction by 50 mm on the three-dimensional coordinates from points PA1 and PA2 may be calculated (specified) as points PA3 and PA4. Further, the vertical direction in this case corresponds to the negative direction of the Y axis of the three-dimensional coordinates.

Thereafter, as illustrated in FIG. 4, the boundary detector 22a sets a region surrounded by a line segment LA1 formed by connecting point PA1 and point PA2, a line segment LA2 formed by connecting point PA1 and point PA3, a line segment LA3 formed by connecting point PA2 and point PA4, and a line segment LA4 formed by connecting point PA3 and point PA4 as a detection area E1 corresponding to the car sill 13a (Step S4), and ends the setting process.

Figure 5:
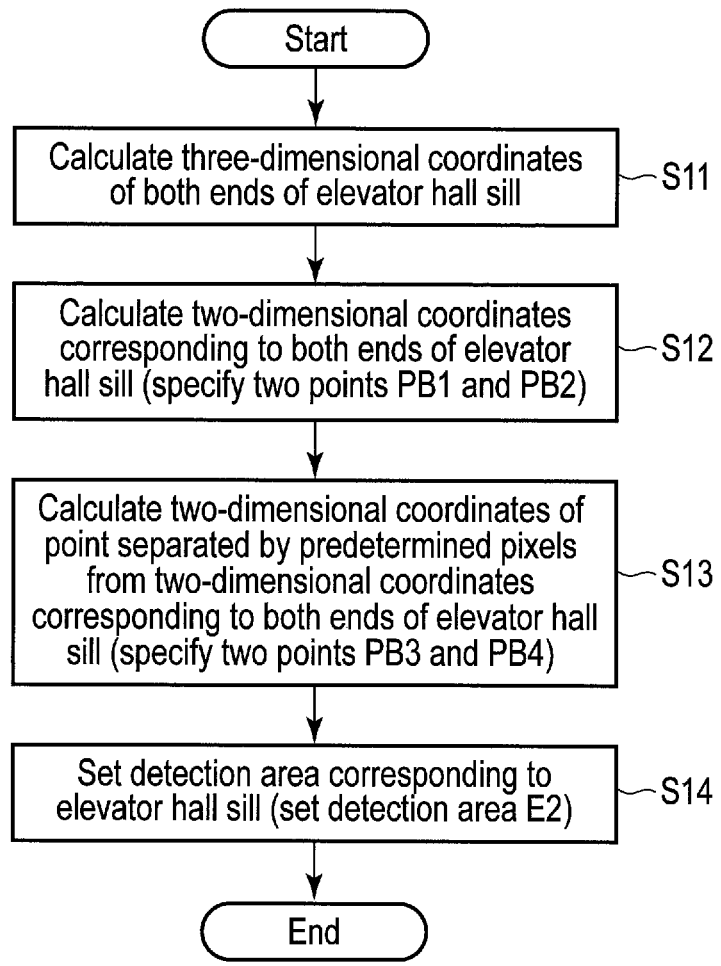
FIG. 5 is a flowchart illustrating an example of the procedure of the setting process of the detection area corresponding to an elevator hall sill according to the embodiment.

Next, the description will be given about an example of the procedure of the setting process of the detection area corresponding to the elevator hall sill 14a which is performed by the boundary detector 22a with reference to the flowchart of FIG. 5 and the diagram of FIG. 6.

First, the boundary detector 22a calculates the three-dimensional coordinates of both ends of the elevator hall sill 14a in the floor surface based on the width (Condition a) of the elevator hall sill 14a and the relative position (Condition c) of the camera 12 with respect to the elevator hall sill 14a in three-dimensional space (Step S11).

Subsequently, the boundary detector 22a projects the three-dimensional coordinates of the both ends of the elevator hall sill 14a calculated in Step S11 to the two-dimensional coordinates on the captured image to calculate the two-dimensional coordinates corresponding to the both ends of the elevator hall sill 14a. Specifically, the boundary detector 22a calculates the two-dimensional coordinates of points PB1 and PB2 in a case where the horizontal direction of the captured image illustrated in FIG. 6 is set to the X axis and the vertical direction is set to the Y axis (Step S12).

Figure 6:
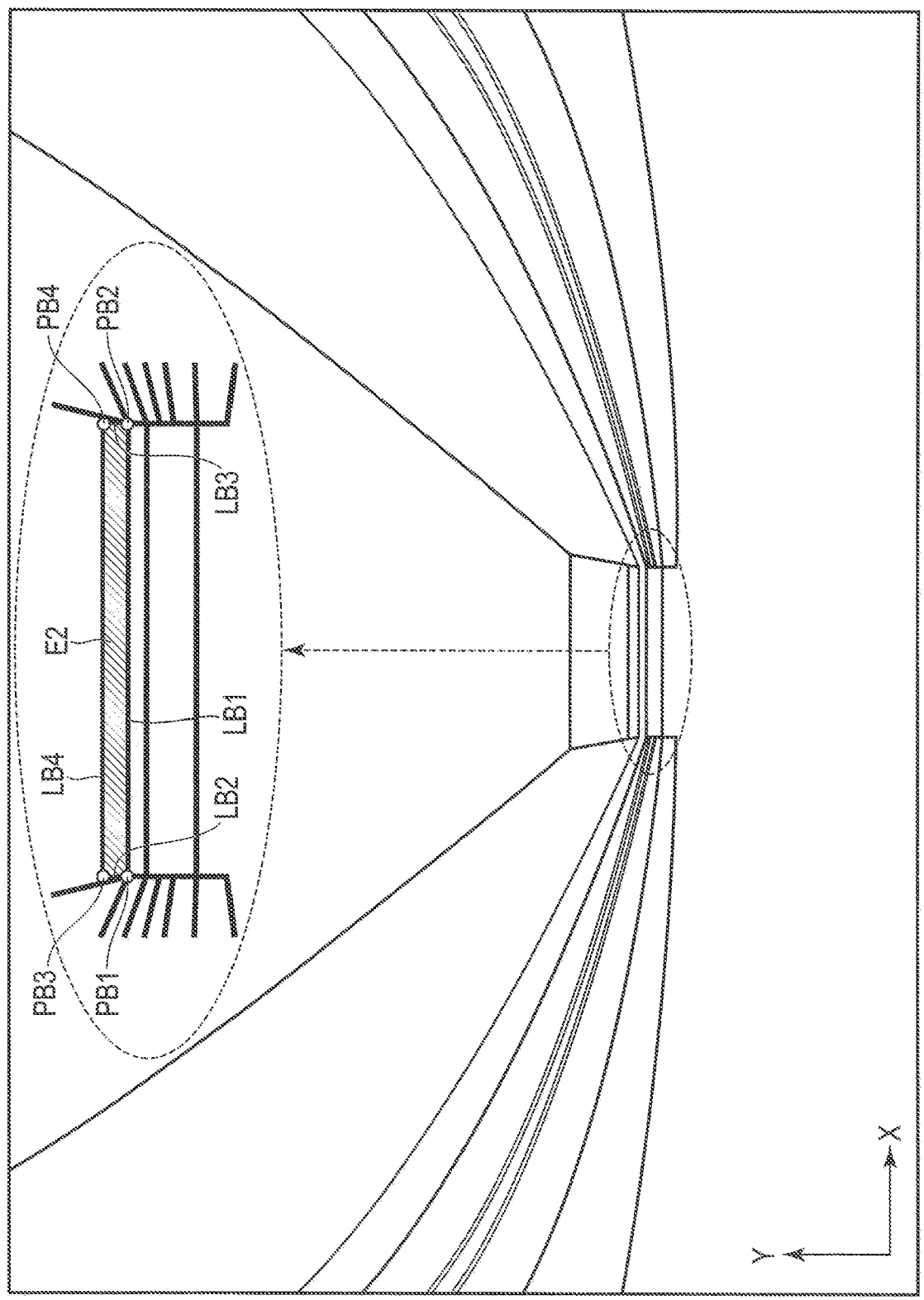
FIG. 6 illustrates an example of the detection area corresponding to the elevator hall sill according to the embodiment.

Next, as illustrated in FIG. 6, the boundary detector 22a calculates two points PB3 and PB4 located to be separated in the vertical direction by predetermined pixels (for example, 5 pixels) from the pixels located at two points PB1 and PB2 which are specified by the two-dimensional coordinates calculated in Step S12 (Step S13). The vertical direction corresponds to the positive direction of the Y axis of the two-dimensional coordinates.

Thereafter, as illustrated in FIG. 6, the boundary detector 22a sets a region surrounded by a line segment LB1 formed by connecting point PB1 and point PB2, a line segment LB2 formed by connecting point PB1 and point PB3, a line segment LB3 formed by connecting point PB2 and point PB4, and a line segment LB4 formed by connecting point PB3 and point PB4 as a detection area E2 corresponding to the elevator hall sill 14a (Step S14), and ends the setting process.

Further, the description will be given with reference to the diagram of FIG. 7 about the setting of the detection area corresponding to a gap between the car sill 13a and the elevator hall sill 14a which is performed by the boundary detector 22a.

Figure 7:
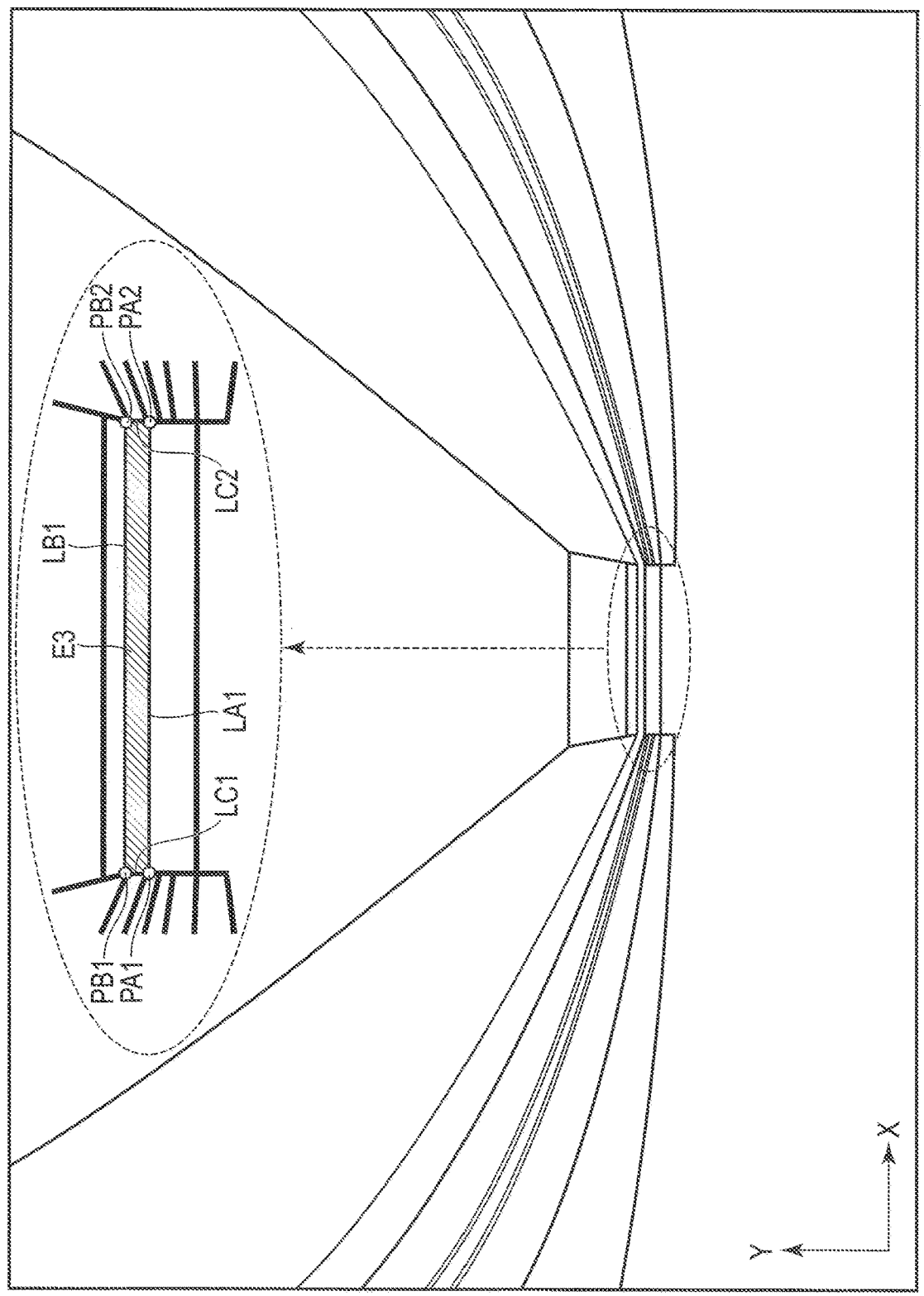
FIG. 7 illustrates an example of the corresponding detection area between the car sill and the elevator hall sill according to the embodiment.

As illustrated in FIG. 7, the boundary detector 22a sets a region surrounded by the line segment LA1 formed by connecting point PA1 and point PA2 calculated in Step S2, the line segment LB1 formed by connecting point PB1 and point PB2 calculated in Step S12, a line segment LC1 formed by connecting point PA1 and point PB1, and a line segment LC2 formed by connecting point PA2 and point PB2 as a detection area E3 corresponding to a gap between the car sill 13a and the elevator hall sill 14a.

Further, herein, as illustrated in FIGS. 4, 6, and 7, the detection areas corresponding to the car sill 13a, the elevator hall sill 14a, and the gap are exemplified. However, for example, in a case where the car sill 13a and the elevator hall sill 14a are divided into several sills, the detection area may be set for each of the several sills. In other words, a plurality of detection areas corresponding to the car sill 13a, a plurality of detection areas corresponding to the elevator hall sill 14a, and a plurality of detection areas corresponding to the gap may be set.

As described above, with the settings of the detection areas E1 to E3, the regions to detect the boundaries described below can be narrowed down to only the detection areas E1 to E3.

Then, the description turns back to the functions of the boundary detector 22a.

Figure 8:
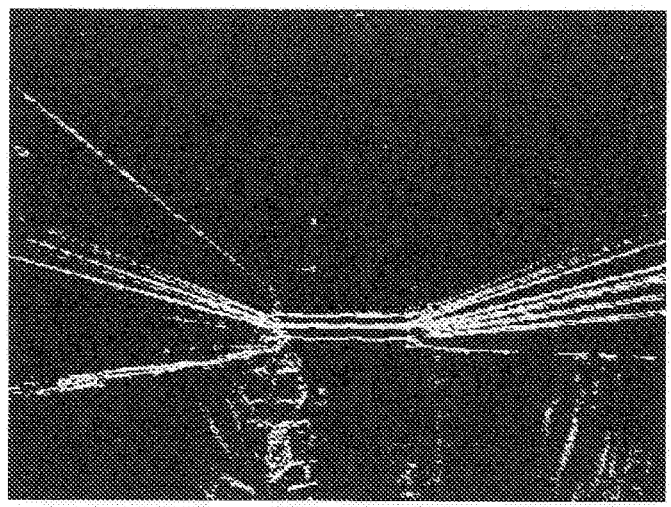
FIG. 8 illustrates an example of a binary image of a captured image according to the embodiment.

The boundary detector 22a detects (extracts) the edges of a person and an object from the captured image. As illustrated in FIG. 8, the captured image is binarized ("0 (no edge)" or "1 (edge)"). With this configuration, a boundary between the car sill 13a and the floor, a boundary between the elevator hall sill 14a and the floor, and a boundary between the car sill 13a and the elevator hall sill 14a and the gap can be detected.

A white portion of FIG. 8 corresponds to the detected edge. A black portion of FIG. 8 corresponds to a portion where the edge is not detected. Further, in FIG. 8, there is illustrated an example in a case where all the edges of a person and an object are detected from the captured image. The boundary detector 22a may detect at least the edges of a person and an object located near the detection areas E1 to E3 from the captured image.

As a method of detecting an edge, for example, there is used a method of comparing pixel values of a predetermined pixel and a pixel adjacent to the predetermined pixel. In other words, the boundary detector 22a compares the pixel values of the predetermined pixel and the pixel adjacent the predetermined pixel. In a case where a difference between these pixel values is equal to or more than a predetermined threshold, the boundary detector 22a detects an edge. In a case where the difference is less than the predetermined threshold, the boundary detector 22a does not detect an edge.

Alternatively, the boundary detector 22a may detect whether there is an edge by comparing the pixel values of a predetermined pixel and a pixel separated by predetermined pixels (predetermined width) from the predetermined pixel. Alternatively, the boundary detector 22a compares an average brightness value of a pixel group of a plurality of pixels with an average brightness value of another (adjacent) pixel group different from the above pixel group. The boundary detector 22a may be configured to detect an edge in a case where a difference between these average brightness values is equal to or more than a predetermined threshold, and not to detect an edge in a case where the difference is less than the predetermined threshold.

Further, as a method of detecting an edge, a well-known method may be used instead of various methods described above.

In addition, in the above description, the boundary detector 22a detects the edges of a person and an object from the captured image in order to detect the boundary between the car sill 13a and the floor, the boundary between the elevator hall sill 14a and the floor, and the boundary between the car sill 13a and the elevator hall sill 14a and the gap, and binarizes the captured image. However, the boundary detector 22a may detect a strength (in other words, a strength of the edge) of a brightness gradient for each pixel by a well-known method to detect the various boundaries described above. Alternatively, the boundary detector 22a may divide the captured image into a number of small regions and analyze textures, and detect pixels distinguished by different textures so as to detect the various boundaries.

Subsequently, the functions of the user detector 22b will be described.

The user detector 22b determines whether there is a user who is likely to be caught by the door based on the captured image (hereinafter, referred to as "binary image") which is binarized by the boundary detector 22a and the various boundaries detected by the boundary detector 22a.

Figure 9:
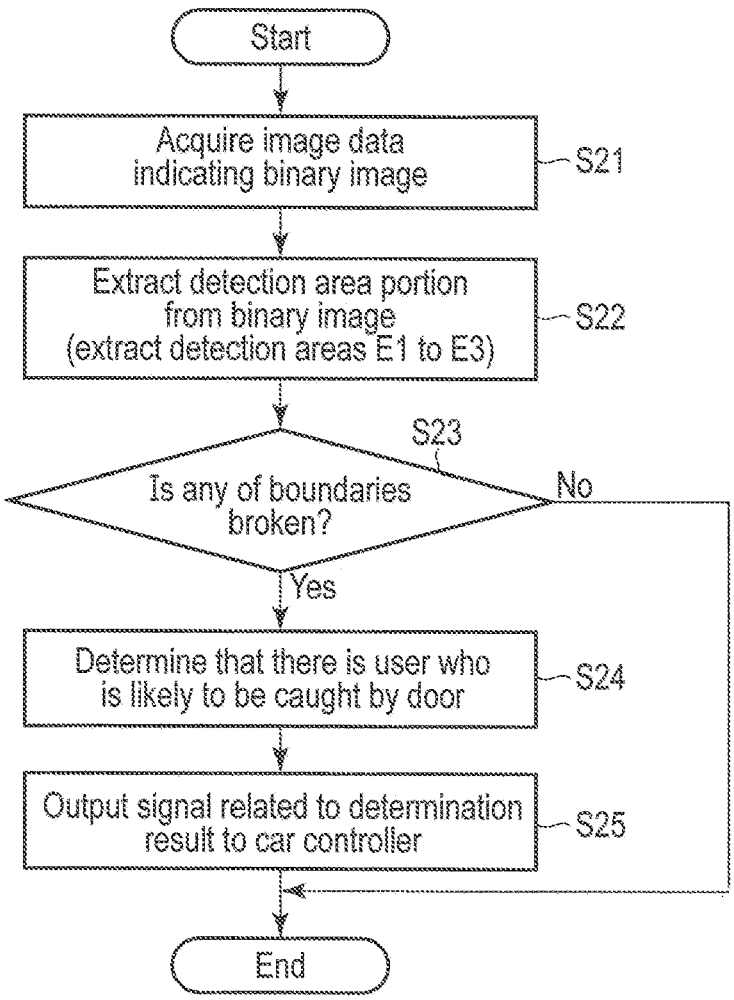
FIG. 9 is a flowchart illustrating an example of the procedure of a user detection process according to the embodiment.

Herein, the description will be given with reference to the flowchart of FIG. 9 about an example of the procedure of a user detection process which is performed by the user detector 22b.

First, the user detector 22b acquires image data indicating the binary image from the boundary detector 22a (Step S21). Further, the image data indicating the binary image may be acquired from the storage 21. Subsequently, the user detector 22b extracts the detection areas E1 to E3 from the binary image displayed by the acquired image data (Step S22).

Next, the user detector 22b determines whether there is a broken boundary among the various boundaries detected by the boundary detector 22a with reference to the images (hereinafter, referred to as "detection area image") of the extracted detection areas E1 to E3 (Step S23). Specifically, the user detector 22b determines whether there is a broken boundary between the car sill 13a and the floor with reference to the detection area image corresponding to the extracted detection area E1. In addition, the user detector 22b determines whether there is a broken boundary between the elevator hall sill 14a and the floor with reference to the detection area image corresponding to the extracted detection area E2. Further, the user detector 22b determines whether there is a broken boundary between the car sill 13a and the elevator hall sill 14a and the gap with reference to the detection area image corresponding to the extracted detection area E3.

Further, in a case where it is determined that there is no broken boundary (NO of Step S23), the user detector 22b determines that there is no user who is likely to be caught by the door, and ends the user detection process.

On the other hand, in a case where it is determined that there is a broken boundary (YES of Step S23), the user detector 22b determines that there is a user who is likely to be caught by the door (Step S24), outputs a signal related to the determination result to the car controller 30 (Step S25), and ends the user detection process.

Next, the process of Step S23 will be described in detail with reference to the flowchart of FIG. 10 and the diagram of FIG. 11.

First, the user detector 22b focuses on a plurality of pixels located in an x-th column among a number of pixels contained in the detection area image extracted in Step S22 (Step S31).

In the detection area image, a number of pixels are contained (for example, m×n pixels). In other words, in the detection area image, as illustrated in FIG. 11, m (m columns) pixels (pixel columns) are arranged in an image horizontal direction, and n (n rows) pixels (pixel rows) are arranged in an image vertical direction. In other words, 1 to m values are substituted for x of Step S31 sequentially.

Subsequently, the user detector 22b calculates a total sum (hereinafter, referred to as "cumulative pixel value") of the values of n pixels arranged in the focused x-th column (Step S32).

The detection area image is an image obtained by extracting the detection area from the binary image. Therefore, the value of the pixel contained in the detection area image is "0" or "1". As described above, in the binary image, the value of the pixel in the white portion is "1", and the value of the pixel in the black portion is "0". Therefore, the user detector 22b calculates the cumulative pixel value of n pixels arranged in the x-th column.

Next, the user detector 22b determines whether the calculated cumulative pixel value is "0" (Step S33). Further, in a case where it is determined that the cumulative pixel value is "0" (YES of Step S33), the user detector 22b determines that the boundary is broken (Step S34). Then, the process of Step S24 is performed.

On the other hand, in a case where it is determined that the cumulative pixel value is not "0" (NO of Step S33), the user detector 22b determines whether all the columns are focused on (Step S35).

Further, in a case where it is determined that all the columns are focused on, that is, a case where it is determined that x=m, (YES of Step S35), the user detector 22b determines that the boundary is not broken (Step S36). In other words, the user detector 22b determines that there is no user who is likely to be caught by the door, and ends the user detection process.

On the other hand, in a case where it is determined that all the columns are not focused on, that is, a case where it is determined that x≠m (NO of Step S35), the user detector 22b adds "1" to "x", and sets the value as a new x (Step S37). Thereafter, the procedure returns to the process of Step S31, and repeatedly performs various processes described above.

Figure 10:
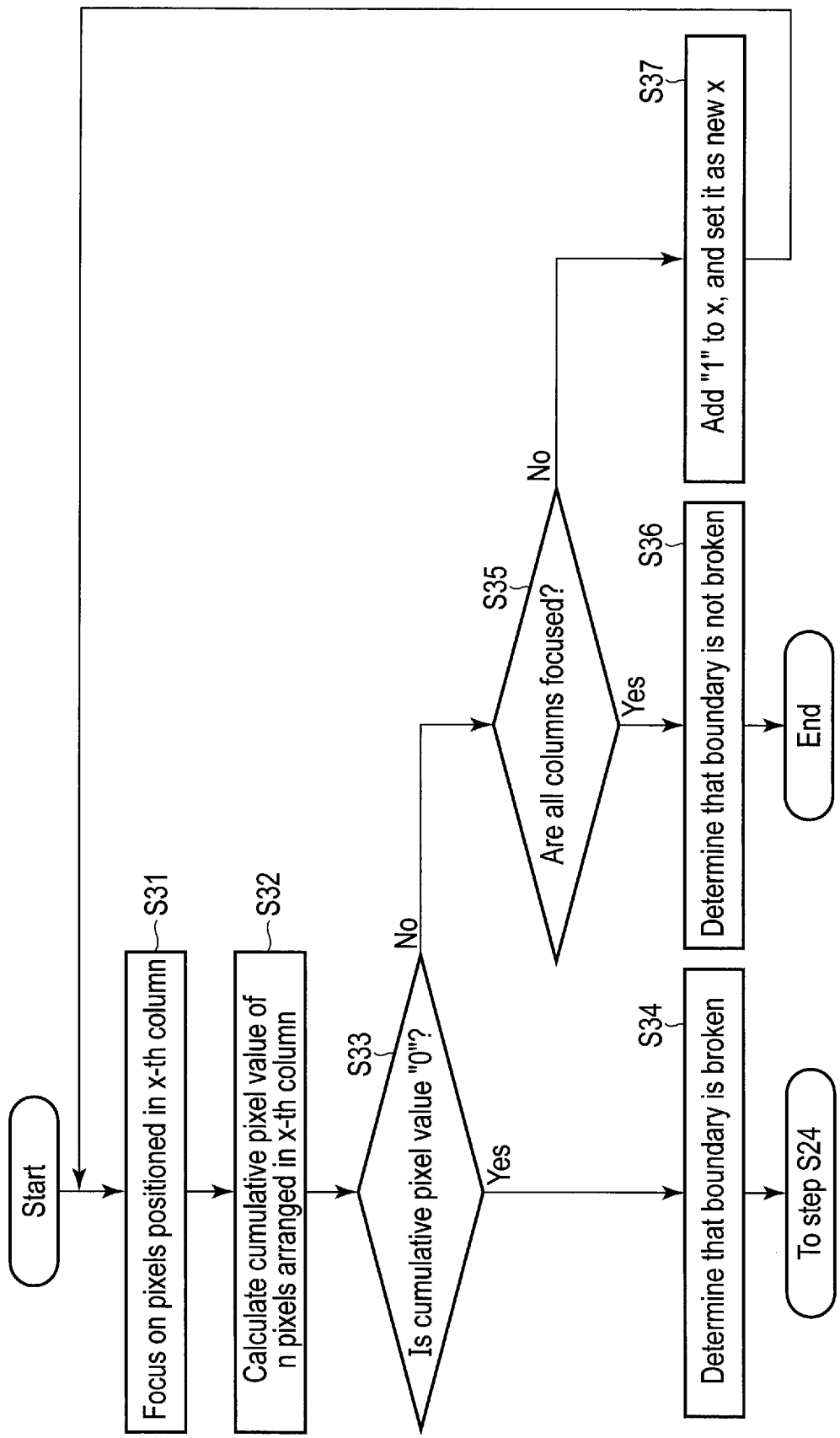
FIG. 10 is a flowchart for describing a part of the process of the flowchart illustrated in FIG. 9 in detail.
Figure 11:
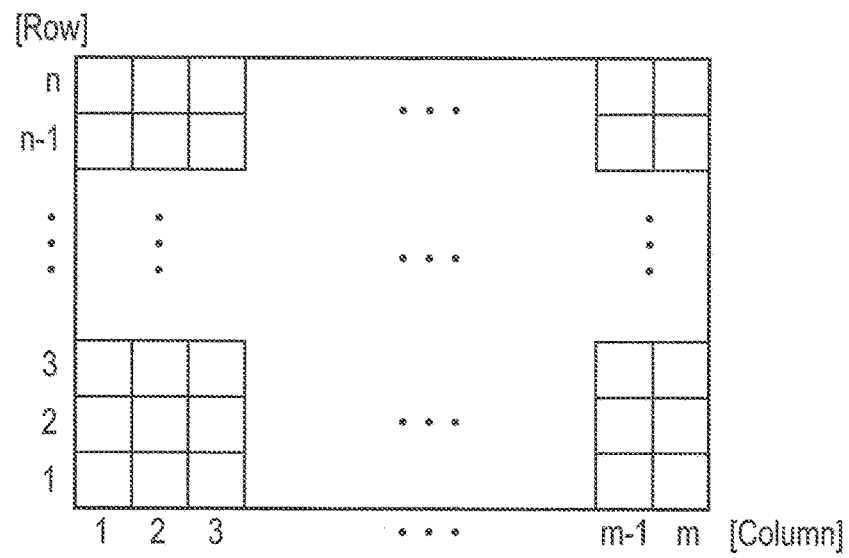
FIG. 11 is a diagram for supplementarily describing the flowchart illustrated in FIG. 10.

FIGS. 12A to 12C and 13A to 13C both illustrate examples of the binary image binarized by the boundary detector 22a, the detection area image corresponding to the detection area E2 extracted from the binary image, and a result in a case where a series of the processes illustrated in FIG. 10 are applied to the detection area image.

Figure 12:
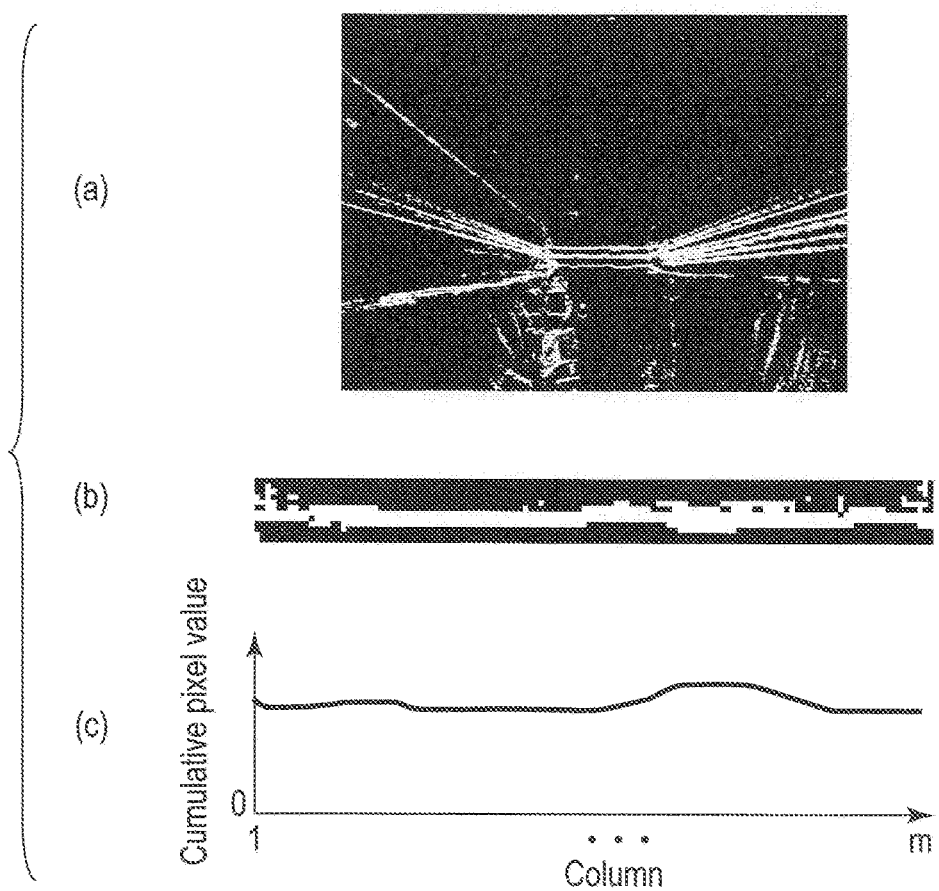
FIG. 12 illustrates an example of transition of a cumulative pixel value in a case where it is determined that there is no user who is likely to be caught by a door.

FIG. 12C illustrates the cumulative pixel value of each column in a case where a series of the processes illustrated in FIG. 10 is applied to the detection area image of FIG. 12B which is extracted from the binary image of FIG. 12A. In FIG. 12C, the vertical axis represents the cumulative pixel value, and the horizontal axis represents a number to identify each column (or a coordinate in the image horizontal direction).

In this case, as illustrated in FIG. 12C, there is no column of which the cumulative pixel value becomes "0". Therefore, the user detector 22b determines that the boundary corresponding to the detection area E2 (that is, the boundary between the elevator hall sill 14a and the floor) is not broken. Then, the user detector 22b determines that there is no user in the detection area E2 who is likely to be caught by the door.

Figure 13:
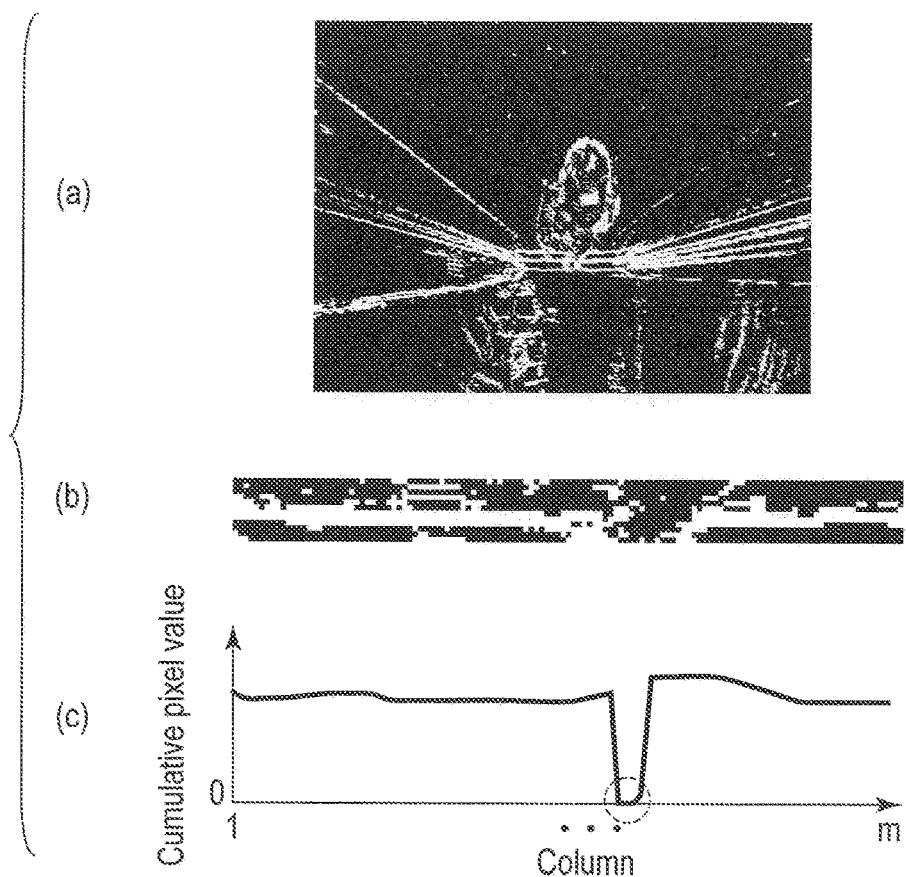
FIG. 13 illustrates an example of transition of the cumulative pixel value in a case where it is determined that there is a user who is likely to be caught by the door.

On the other hand, FIG. 13C illustrates the cumulative pixel value of each column in a case where a series of the processes illustrated in FIG. 10 is applied to the detection area image of FIG. 13B which is extracted from the binary image of FIG. 13A. In this case, the cumulative pixel value becomes "0" in the column surrounded by a dotted line of FIG. 13C. Therefore, the user detector 22b determines that the boundary corresponding to the detection area E2 (that is, the boundary between the elevator hall sill 14a and the floor) is broken. Then, the user detector 22b determines that there is a user in the detection area E2 who is likely to be caught by the door.

Further, the description herein has been given about an example of the detection area image corresponding to the detection area E2. However, the detection area image corresponding to the detection areas E1 and E3 is also the same.

In addition, herein, it is determined whether various boundaries are broken or not by determining whether there is a column of which the cumulative pixel value becomes "0". However, for example, a ratio of the columns of which the cumulative pixel value is equal to or more than "1" (=[the number of columns of which the cumulative pixel value is equal to or more than "1"]/m) is calculated. Then, it may be determined whether various boundaries are broken or not by determining whether the calculated ratio is less than a predetermined threshold (for example, less than 95%). Further, the method of determining whether there is a column of which the cumulative pixel value becomes "0" is the same as that in a case where the threshold is set to 100%.

Alternatively, as the method of determining whether various boundaries are broken, a well-known method such as labeling or Hough transform may be used to detect a straight line from the detection area image, and to determine whether the detected straight line is broken, so that it is determined whether various boundaries are broken.

In addition, in a case where a strength of the brightness gradient of each pixel is used to detect various boundaries, the user detector 22b may calculate the cumulative pixel value for each detection area image as described above to determine that various boundaries are broken in a case where there is a column of which the calculated cumulative pixel value is less than a predetermined threshold. Alternatively, in a case where the ratio of the column of which the cumulative pixel value is less than the predetermined threshold becomes equal to or more than the predetermined threshold (for example, 5% or more), it may be determined that various boundaries are broken. Further, the method using the threshold is applicable even to a case where the edges of a person and an object are detected in order to detect various boundaries, and the captured image is binarized.

In addition, the user detector 22b stores a detection result of the user detection process with respect to one captured image by several frames (for example, 5 frames from the captured frame of the captured image). In a case where the ratio of the detection result indicating that there is a user who is likely to be caught by the door within the 5 frames is equal to or more than a predetermined threshold (for example, 50%), the user detector 22b may duly determines that there is a user who is likely to be caught by the door, and may output a signal related to the determination to the car controller 30.

Further, in this embodiment, the user who is likely to be caught by the door has been described as a detection target. However, the detection target may be a user who is likely to be involved in an accident when the door is opened or closed. For example, a user who is likely to run into the door may be the detection target.

In addition, this embodiment has been described about that the detection area is set in a case where the door is completely opened, and the user detection process is performed. However, for example, the user detection process may be performed during a period when the door is closed or a period when the door is opened. In this case, the boundary detector 22a may set the detection area after adjusting the width (the length in the image horizontal direction) of the detection area in accordance with an opened degree of the door. In addition, the boundary detector 22a may adjust the width of the detection area in accordance with the opened degree of the door for each captured frame. In other words, the boundary detector 22a may dynamically change the detection area.

According to the first embodiment described above, the image processing device 20 includes the detector 22 which can detect whether there is a user who is likely to be caught by the door from one captured image. With this configuration, it is possible to save trouble of preparing a reference image in advance, and to realize the user detection process which is not influenced by the illumination condition. In other words, it is possible to provide the user detection system with a high safety.

In addition, in the user detection process according to this embodiment, just only one captured image is used. Therefore, it is possible to shorten a time taken for detecting whether there is a user who is likely to be caught by the door. In other words, it is possible to shorten a time taken for the user detection process.

Second Embodiment

Next, a second embodiment will be described. In the first embodiment described above, the detection area has been set at a position where the car sill 13a and the elevator hall sill 14a are estimated to be come out on the captured image. However, in this embodiment, the detection area is set at a position where the tip ends of the car door 13 and the elevator hall door 14 are estimated to be come out on the captured image. Further, the tip ends of the car door 13 and the elevator hall door 14 may be called the ends located in a closing direction among both ends of the car door 13 and the elevator hall door 14.

Alternatively, the tip ends may be called the ends located on a door stop side among both ends of the car door 13 and the elevator hall door 14. In the following, the functional units having the same function as those in the first embodiment will be attached with the same symbol, and the details thereof will be omitted. In the following, the description will be given mainly about portions different from the first embodiment.

Further, in this embodiment, the camera 12 is assumed to be installed in a single-open type of elevator. Therefore, the tip ends of the car door 13 and the elevator hall door 14 each are one, and the number of the set detection areas is also one. However, in a case where the camera 12 is installed in a center-open type of elevator, the tip ends of the car door 13 and the elevator hall door 14 each are two, and the number of the set detection areas is also two. However, a setting method of the detection area is similar in both types. Therefore, the setting of the detection area in a case where the camera 12 is installed in the center-open type of elevator will be omitted herein.

The boundary detector 22a sets the detection area at a position where the tip ends of the car door 13 and the elevator hall door 14 are estimated to be come out on the captured image as described above. The position where the tip ends of the car door 13 and the elevator hall door 14 are estimated to be come out is calculated based on the above-described conditions (a) to (e) and the current opened degree of the car door 13.

Further, the boundary detector 22a may communicate with the car controller 30 to acquire information indicating the current opened degree of the car door 13.

Alternatively, the boundary detector 22a first communicates with the car controller 30 to acquire a signal indicating that the car door 13 starts to open from a fully closed state or a signal indicating that the car door 13 starts to close from a fully opened state. Thereafter, the boundary detector 22a may calculate the current opened degree of the car door 13 based on an elapsed time from timing when these signals are acquired and an open/close speed of the car door 13.

Alternatively, the boundary detector 22a may perform a well-known image analysis on the acquired captured image to calculate the current opened degree of the car door 13.

Herein, the description will be given with reference to the flowchart of FIG. 14 and the diagram of FIG. 15 about an example of the procedure of the setting process of the detection area corresponding to the tip end of the car door 13 which is performed by the boundary detector 22a.

First, the boundary detector 22a calculates the three-dimensional coordinates of the lower portion of the tip end and the three-dimensional coordinates at a position (hereinafter, referred to as "tip upper portion") extending in the vertical direction by a height (or the height of the car door 13) from the lower portion of the tip end (hereinafter, referred to as "tip lower portion") up to the camera 12 based on the current opened degree of the car door 13, the relative position of the camera 12 with respect to the tip lower portion where the tip end of the car door 13 and the floor surface come into contact (abuts) in the three-dimensional space, and the height from the tip lower portion up to the camera 12 (or the height of the car door 13) (Step S41).

Subsequently, the boundary detector 22a projects the three-dimensional coordinates of the tip lower end and the tip upper portion calculated in Step S41 to the two-dimensional coordinates on the captured image to calculate the two-dimensional coordinates corresponding to the tip lower portion and the tip upper portion. Specifically, the boundary detector 22a calculates the two-dimensional coordinates of points PD1 and PD2 of the captured image illustrated in FIG. 15 (Step S42).

Figure 15:
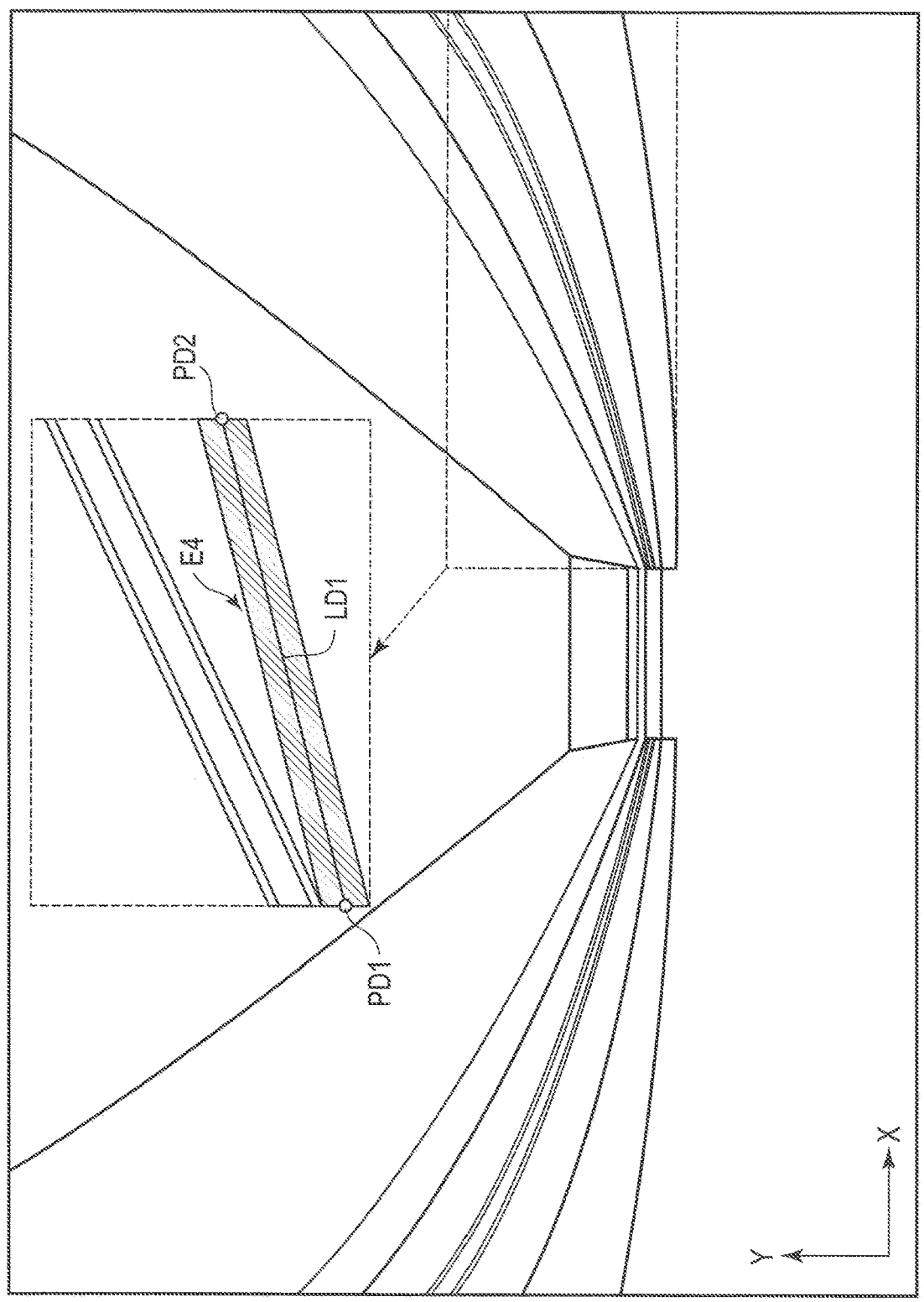
FIG. 15 illustrates an example of the detection area corresponding to the tip end of the door according to the embodiment.

Thereafter, as illustrated in FIG. 15, the boundary detector 22a sets a region containing a portion located to be separated by the predetermined pixels (for example, 5 pixels) from a line segment LD1 (pixels located above) formed by connecting two points PD1 and PD2 which are specified by the two-dimensional coordinates calculated in Step S42 as a detection area E4 corresponding to the tip end of the car door 13 (Step S43), and ends the setting process. Further, the method is applicable even to the setting of the detection area of the first embodiment. In other words, with the specification of only two points instead of four points, the detection areas E1 to E3 may be set by the method.

Figure 16:
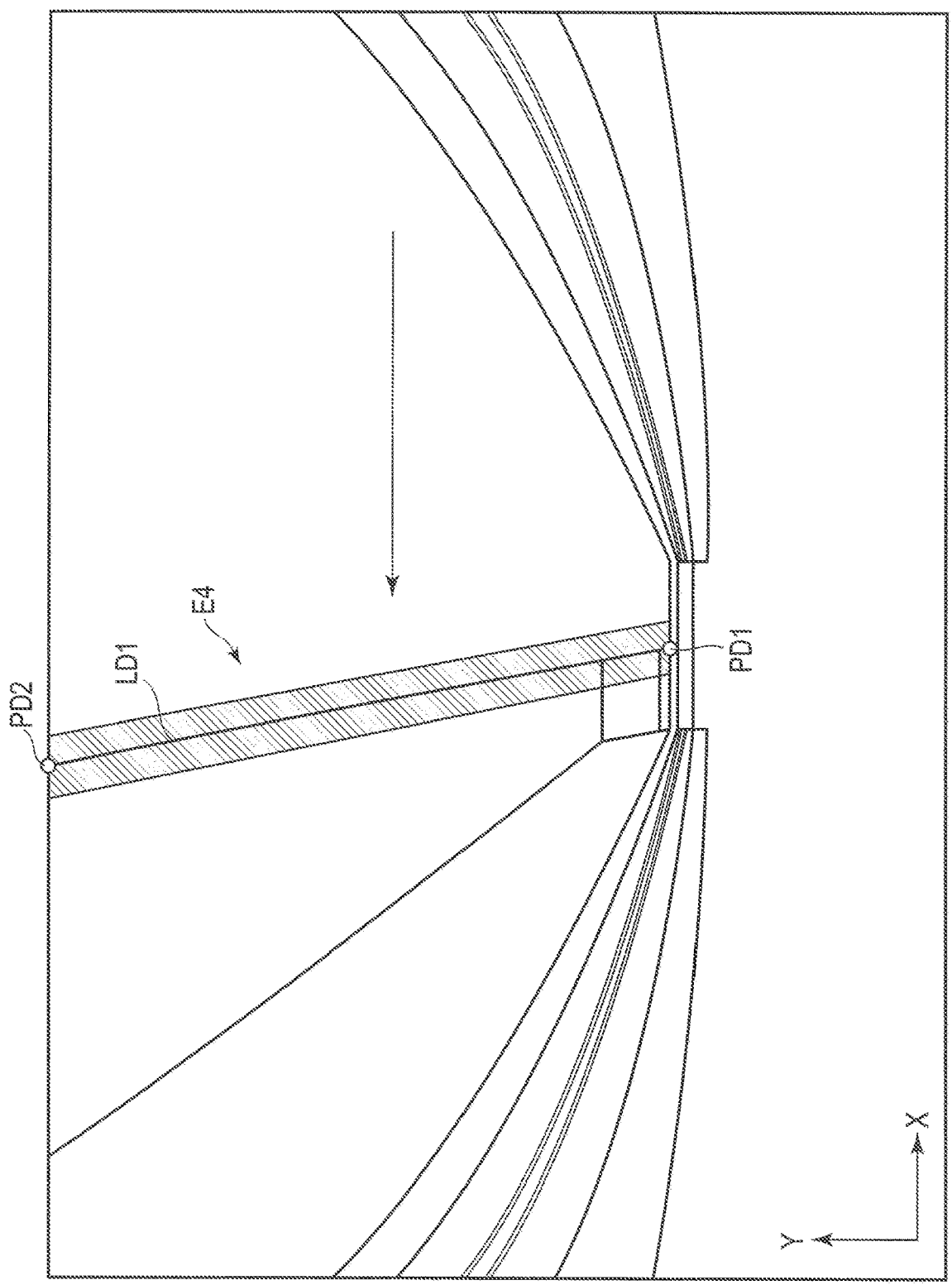
FIG. 16 illustrates another example of the detection area corresponding to the tip end of the door according to the embodiment.

Further, FIG. 15 illustrates an example of the setting of the detection area when the car door 13 is a fully opened state (the current opened degree of the car door 13 is maximum). However, the setting of the detection area when the car door 13 is a closed state is also the same. In this case, the detection area E4 as illustrated in FIG. 16 is set.

Figure 14:
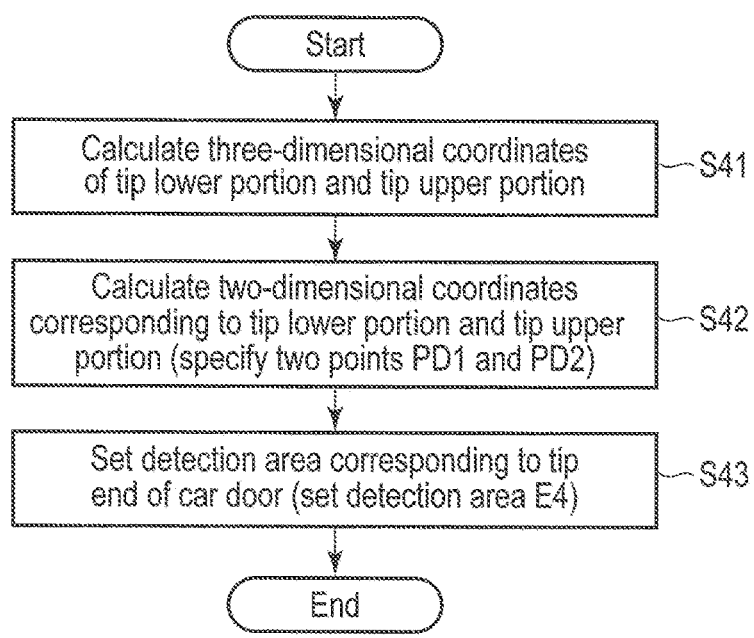
FIG. 14 is a flowchart illustrating an example of the procedure of the setting process of the detection area corresponding to the tip end of a car door according to a second embodiment.

In addition, while the details have been omitted, as described above, in a case where the camera 12 is installed in the center-open type of elevator, a series of the processes illustrated in FIG. 14 are performed on two doors on the right and left sides so as to set the detection area for each door.

The process of detecting various boundaries which is performed after the detection area E4 is set is similar to the first embodiment. In other words, the boundary detector 22a detects at least the edges of a person and an object located near the detection area E4, and detects the boundary.

Further, the boundary detected by the boundary detector 22a differs according to the current opened/closed state of the car door 13 (the current opened degree of the car door 13). For example, in a case where the car door 13 is in a fully opened state (the current opened degree of the car door 13 is maximum), the boundary between the tip end of the car door 13 and the entrance column installed in a region near the car door 13 is detected. In addition, in a case where the car door 13 is in a closed state, the boundary between the tip end of the car door 13 and the background (the floor of the elevator hall 15) is detected.

The user detection process performed by the user detector 22b is also similar to the first embodiment. In other words, the user detector 22b determines whether the boundary detected by the boundary detector 22a is broken with reference to the detection area image corresponding to the detection area E4, and detects whether there is a user who is likely to be caught by the door.

FIGS. 17A to 17C and 18A to 18C both illustrate results in a case where the binary image binarized by the boundary detector 22a, the detection area image corresponding to the detection area E4 extracted from the binary image, and a result in a case where a series of the processes illustrated in FIG. 10 are applied to the detection area image.

Figure 17:
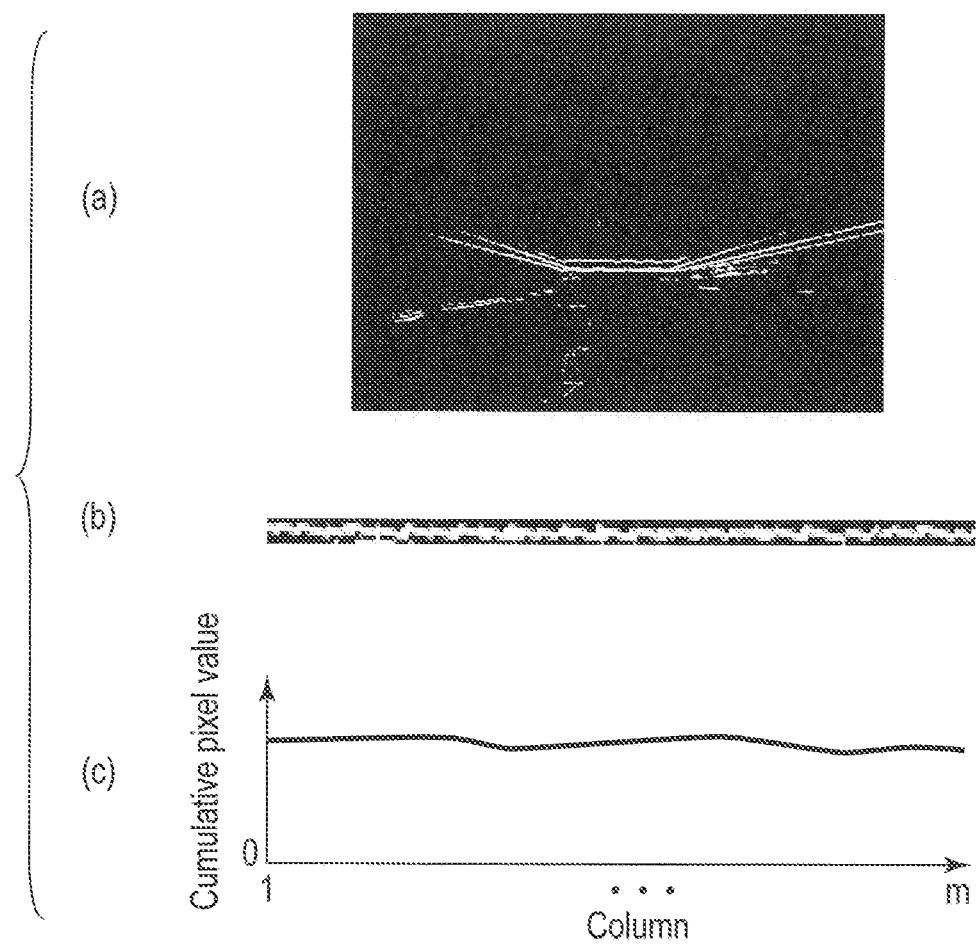
FIG. 17 illustrates an example of transition of the cumulative pixel value in a case where it is determined that there is no user who is likely to be caught by the door.

The cumulative pixel value of each column in a case where a series of the processes illustrated in FIG. 10 described in the first embodiment are applied to the detection area image of FIG. 17B which is extracted from the binary image of FIG. 17A is illustrated in FIG. 17C. In this case, as illustrated in FIG. 17C, there is no column of which the cumulative pixel value becomes "0". In this case, the car door 13 is in a fully opened state. Therefore, the user detector 22b determines that the boundary corresponding to the detection area E4 (the boundary between the tip end of the car door 13 and the entrance column installed in a region near the car door 13) is not broken. Then, the user detector 22b determines that there is no user in the detection area E4 who is likely to be caught by the door.

Figure 18:
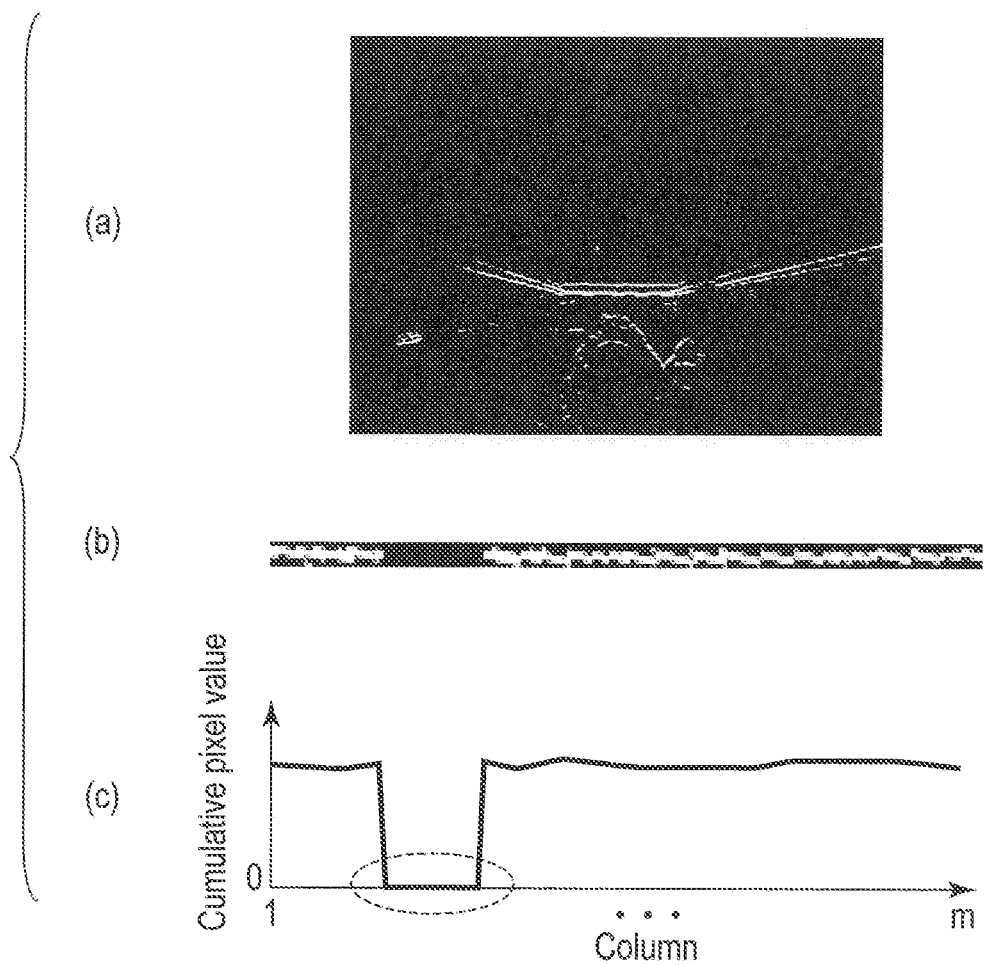
FIG. 18 illustrates an example of transition of the cumulative pixel value in a case where it is determined that there is a user who is likely to be caught by the door.

On the other hand, the cumulative pixel value of each column in a case where a series of the processes illustrated in FIG. 10 described in the first embodiment is applied to the detection area image of FIG. 18B which is extracted from the binary image of FIG. 18A is illustrated in FIG. 18C. In this case, as illustrated in FIG. 18A, the cumulative pixel value becomes "0" in the column surrounded by the dotted line of FIG. 18C due to a user's hand. In this case, the car door 13 is in a fully opened state. Therefore, the user detector 22b determines that the boundary corresponding to the detection area E4 (the boundary between the tip end of the car door 13 and the entrance column installed in a region near the car door 13) is broken. Then, the user detector 22*b* determines that there is a user in the detection area E4 who is likely to be caught by the door.

Further, similarly to the first embodiment, a ratio of the column of which the cumulative pixel value is equal to or more than "1" may be calculated to determine whether the calculated ratio is less than a predetermined threshold, so that it may be possible to determine whether the boundary is broken. Alternatively, a straight line may be detected from the detection area image using a well-known method such as labeling or Hough transform to determine whether the detected straight line is broken, so that it may be possible to determine whether the boundary is broken.

Further, a strength of the brightness gradient for each pixel may be used to detect the boundary instead of the edge. In this case, similarly to the first embodiment, in a case where the cumulative pixel value is calculated for each column of the detection area image, and there is a column of which the calculated cumulative pixel value is less than a predetermined threshold, it may be possible to determine that the boundary is broken. Alternatively, in a case where a ratio of the column of which the cumulative pixel value is less than a predetermined threshold is equal to or more than a predetermined threshold, it may be possible to determine that the boundary is broken.

In addition, similarly to the first embodiment, the user detector 22*b* stores a detection result of the user detection process with respect to one captured image by several frames (for example, 5 frames from the captured frame of the captured image). In a case where the ratio of the detection result indicating that there is a user who is likely to be caught by the door within the 5 frames is equal to or more than a predetermined threshold (for example, 50%), the user detector 22*b* may duly determines that there is a user who is likely to be caught by the door, and may output a signal related to the determination to the car controller 30.

According to the second embodiment described above, the image processing device 20 sets the detection area E4 corresponding to the tip end of the car door 13 in addition to the detection areas E1 to E3 corresponding to the sill, and includes the detector 22 which can detect whether there is a user in the detection area E4 who is likely to be caught by the door. According to this configuration, it is possible to detect whether there is a user in a wider range who is likely to be caught by the door. In other words, it is possible to provide the user detection system with a higher safety.

According to at least one of the embodiments described above, it is possible to provide the user detection system which can detect a person and an object which are likely to be caught by the door without being influenced by the illumination condition at the time of capturing an image by the camera.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A user detection system, comprising:
a camera which is installed in a peripheral region of a door, and captures a running region where the door runs when opening or closing the door and a region near the door;
a boundary detector which detects a boundary between a groove sill for opening/closing the door as a first structure and a floor as a second structure in the region near the door based on an image captured by the camera;
a user detector which detects whether there is a user in the running region based on a result detected by the boundary detector; and
a controller which controls an open/close operation of the door based on a result detected by the user detector.

2. The user detection system of claim 1,
wherein the boundary detector detects a straight boundary between the first structure and the second structure, and
wherein the user detector detects whether there is a user in the running region based on whether the straight boundary detected by the boundary detector is broken.

3. The user detection system of claim 2,
wherein the user detector determines that there is a user in the running region in a case where the straight boundary is broken.

4. The user detection system of claim 1,
wherein the boundary detector sets a detection area based on a dimension of the door, and narrows an area to detect the boundary down to the detection area.

5. The user detection system of claim 1,
wherein the boundary detector detects the boundary based on one image which is captured by the camera.

6. The user detection system of claim 1,
wherein the boundary detector binarizes the image captured by the camera to detect the boundary between the first structure and the second structure, and
wherein the user detector
focuses on a pixel group located in an x-th column among a number of pixels of the binarized image,
calculates a total sum of pixel values of the focused pixel group, and
detects whether there is a user in the running region based on whether the calculated total sum is "0".

7. The user detection system of claim 1,
wherein the boundary detector binarizes the image captured by the camera to detect the boundary between the first structure and the second structure, and
wherein the user detector
focuses sequentially on pixel columns arranged in a horizontal direction among a number of pixels which are arranged in the horizontal direction and a vertical direction of the binarized image,
calculates total sums of pixel values of the focused pixel columns sequentially, and
detects whether there is a user in the running region based on whether a ratio of the pixel columns of which the calculated total sum is equal to or more than "1" is less than a threshold.

8. A detection system, comprising:
a camera, positioned in a peripheral region of a door, configured to capture a running region where the door runs when opening or closing the door and a region near the door;
a boundary detector configured to detect a boundary between a tip end of the door as a first structure and an entrance column installed in a region near the door as a second structure in the region near the door based on an image captured by the camera;

an object detector configured to detect whether there is an object in the running region based on a result detected by the boundary detector; and a controller configured to control an open/close operation of the door based on a result detected by the object detector.

9. The detection system of claim 8, wherein the boundary detector configured to detect a straight boundary between the first structure and the second structure, and wherein the object detector is configured to detect whether there is an object in the running region based on whether the straight boundary detected by the boundary detector is broken.

10. The detection system of claim 9, wherein the object detector is configured to determine that there is an objectd in the running region in a case where the straight boundary is broken.

11. The detection system of claim 8, wherein the boundary detector is configured to set a detection area based on a dimension of the door, and narrow an area to detect the boundary down to the detection area.

12. The detection system of claim 8, wherein the boundary detector is configured to detect the boundary based on one image which is captured by the camera.

13. The detection system of claim 8, wherein the boundary detector is configured to binarize the image captured by the camera to detect the boundary between the first structure and the second structure, and wherein the object detector is configured to
  focus on a pixel group located in an x-th column among a number of pixels of the binarized image,
  calculate a total sum of pixel values of the focused pixel group, and
  detect whether there is an object in the running region based on whether the calculated total sum is "0".

14. The detection system of claim 8, wherein the boundary detector is configured to binarize the image captured by the camera to detect the boundary between the first structure and the second structure, and wherein the object detector is configured to
  focus sequentially on pixel columns arranged in a horizontal direction among a number of pixels which are arranged in the horizontal direction and a vertical direction of the binarized image,
  calculate total sums of pixel values of the focused pixel columns sequentially, and
  detect whether there is an object in the running region based on whether a ratio of the pixel columns of which the calculated total sum is equal to or more than "1" is less than a threshold.

15. A detection system, comprising:

a camera, positioned in a peripheral region of a door, and configured to capture a running region where the door runs when opening or closing the door and a region near the door;

a boundary detector configured to detect a boundary between a tip end of the door as a first structure and a floor as a second structure in the region near the door based on an image captured by the camera;

an object detector configured to detect whether there is an object in the running region based on a result detected by the boundary detector; and a controller which controls an open/close operation of the door based on a result detected by the object detector.

16. The detection system of claim 15, wherein the boundary detector is configured to detect a straight boundary between the first structure and the second structure, and wherein the user detector s configured to detect whether there is an object in the running region based on whether the straight boundary detected by the boundary detector is broken.

17. The detection system of claim 16, wherein the object detector is configured to determine that there is an object in the running region in a case where the straight boundary is broken.

18. The detection system of claim 15, wherein the boundary detector is configured to set a detection area based on a dimension of the door, and narrow an area to detect the boundary down to the detection area.

19. The detection system of claim 15, wherein the boundary detector is configured to detect the boundary based on one image which is captured by the camera.

20. The detection system of claim 15, wherein the boundary detector is configured to binarize the image captured by the camera to detect the boundary between the first structure and the second structure, and wherein the object detector is configured to
  focus on a pixel group located in an x-th column among a number of pixels of the binarized image,
  calculate a total sum of pixel values of the focused pixel group, and
  detect whether there is a object in the running region based on whether the calculated total sum is "0".

21. The detection system of claim 15, wherein the boundary detector is configured to binarize the image captured by the camera to detect the boundary between the first structure and the second structure, and wherein the object detector is configured to
  focus sequentially on pixel columns arranged in a horizontal direction among a number of pixels which are arranged in the horizontal direction and a vertical direction of the binarized image,
  calculate total sums of pixel values of the focused pixel columns sequentially, and
  detect whether there is an object in the running region based on whether a ratio of the pixel columns of which the calculated total sum is equal to or more than "1" is less than a threshold.

* * * * *